United States Patent [19]

Ikeda

[11] 4,295,736
[45] Oct. 20, 1981

[54] OPTICAL ASSEMBLY FOR USE IN COPYING MACHINE

[75] Inventor: Hiroshi Ikeda, Aichi, Japan

[73] Assignee: Minolta Camera Kabushiki Kaisha, Osaka, Japan

[21] Appl. No.: 94,313

[22] Filed: Nov. 14, 1979

[30] Foreign Application Priority Data

Nov. 14, 1978 [JP] Japan .............................. 53-157174

[51] Int. Cl.³ ..................... G03B 27/34; G03B 27/40; G03B 27/70
[52] U.S. Cl. ......................................... 355/57; 355/8; 355/66
[58] Field of Search ................... 355/3 R, 3 SH, 8, 57, 355/65, 66

[56] References Cited

U.S. PATENT DOCUMENTS

| | | |
|---|---|---|
| 3,431,053 | 3/1969 | Wick et al. ............................ 355/66 |
| 3,572,924 | 3/1971 | Matsumoto et al. .................. 355/57 |
| 3,600,066 | 8/1971 | Del Vecchio ...................... 355/58 X |
| 3,884,574 | 5/1975 | Doi et al. ............................ 355/8 X |
| 4,080,062 | 3/1978 | Torigai et al. ..................... 355/57 X |
| 4,154,524 | 5/1979 | Hattori et al. ......................... 355/57 |
| 4,192,609 | 3/1980 | Tani et al. ......................... 355/57 X |

*Primary Examiner*—Richard A. Wintercorn
*Attorney, Agent, or Firm*—Wenderoth, Lind & Ponack

[57] ABSTRACT

For end positions of the elements of an minute adjustment of the optical system set for magnifications having the same conjugate distance, the focal adjustment for one of two magnification modes is first performed by adjusting the position of a mirror assembly, and the adjustment for the other magnification mode is performed only by adjusting the end position of the lens assembly at the position for the other magnification mode. Hence, during the change of the magnification modes from one to the other the position of the mirror assembly per se remains unchanged.

10 Claims, 15 Drawing Figures

OPTICAL ASSEMBLY FOR USE IN COPYING MACHINE

BACKGROUND OF THE INVENTION

The present invention relates to an electrophotographic copying machine of a type having a plurality of magnification modes and, more particularly, to an adjustment means for controlling the correlation of members constituting an optical system to suit a particular magnification mode.

Up to the present, so far as an optical system capable of effecting various magnifying powers in any type of copying machine is concerned, there have been already proposed a number of arrangements and improvements thereof. According to such conventional arrangements, the power of magnification is in general varied by shifting the mirrors so as to readjust the conjugate distance (the distance between an original image carrying surface and a photosensitive or photoreceptor surface), with the lens assembly being also moved so as to change the magnifications. However, almost all the conventional systems provide arrangements which only achieve a reduction in the magnifying power. From a constructional point of view, according to the conventional system, the control of movement of the mirrors is ordinarily arranged to be performed by a cam mechanism provided in the system. Such being the case, it is quite unreasonable to except that precise control in positioning of the mirrors can be effected in a predetermined manner only by increasing the precision of the cam mechanism, without taking into account, for example, the surface condition of the mirrors, errors in focal length occurring in the manufacture of the lens assembly or the like. Thereby, as a result, a focusing adjustment per se can not be omitted for every variation of the magnification mode.

Figure 1:
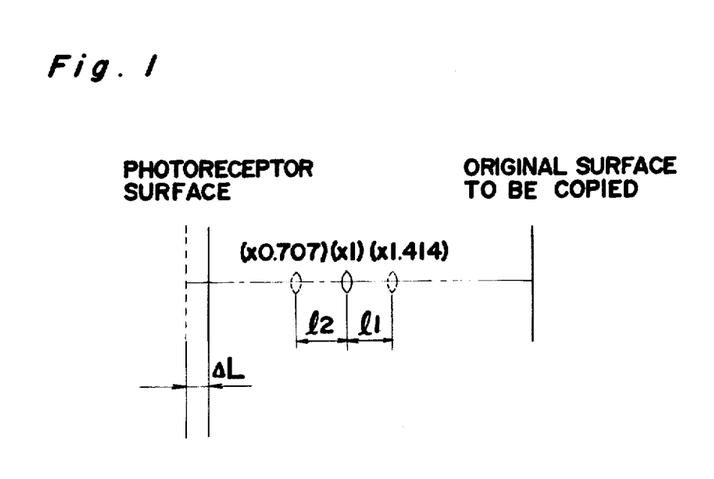
FIG. 1 illustrates schematically the principle of the correlation of members constituting an optical system to suit a particular magnification mode.

Referring now to FIG. 1, there is shown an explanatory diagram particularly showing the relationship between the conjugate distance mentioned above and the property specific to the lens in connection with the variation of the magnification mode. More specifically, there exist the following two relationships between the relative amount of variation of the conjugate distance $\Delta L$ and the relative amount of movement $l$ of the lens assembly or the lens, relative to a full size reproduction mode.

$$\Delta L = \frac{(1-\beta)^2}{\beta} \cdot f \quad (1)$$

$$l = \frac{(1-\beta)}{\beta} \cdot f \quad (2)$$

$\beta$: the magnification
f: the focal length of the lens assembly

For example, according to the relationships (1) and (2), when a case wherein the focal length f and the magnification $\beta_1$ are 280 mm and 1.414, respectively and another case where f=280 mm and $\beta_2=0.707$ are compared, the relative amounts of variation of the conjugate distance are the same and have the same value of $\Delta L \approx 34$ mm. However, respective amounts of movement of the lens assembly are different, with $l_1 \approx 82$ mm for the former case and $l_2 \approx 116$ mm for the latter case.

In general, in view of the manufacturing error involved as described above, an error of approximately one percent is ordinarily inherent in the focal length of the lens assembly and therefore, the focusing error for the lens assembly having a f-value of 280 mm correspondingly has an approximate value of $\pm 3$ mm. In association with the error as described above, an error of approximate $\pm 12$ mm is in turn caused in the conjugate distance. Therefore, when the apparatus is converted from the full size reproduction mode of a reduced size mode having the magnification of 0.707, the error of the relative amount of variation of the conjugate distance $\Delta L$ is correspondingly caused to be approximately $\pm 0.4$ mm. As a matter of fact, in addition to the error described above, when such effects as are caused, for example, by surface conditions of the mirrors, mechanical precision of the cam mechanism and the like are taken into consideration, it is clear that precise control in positioning of the mirrors can be hardly performed simply by the conventional cam mechanism. Therefore, according to the further improved conventional devices, the focusing adjustment is performed by the precise adjustment of means for determining the locations of the mirrors, with the lens assembly per se being disposed at a predetermined location by a stationary stop.

As far as an optical system arranged to achieve only one reduced size reproduction mode is concerned, the arrangement of the optical system described above achieves a good result without causing any operating defects. However, with respect to an optical system, wherein a plurality of magnification modes are to be provided, such conventional means as described above will not achieve a satisfactory result. Moreover, in an optical system including at least one paired reduced and enlarged size reproduction modes each having the same or approximately the same conjugate distance, although the conjugate distances are the same or approximately the same as shown in FIG. 1, the optical system of the prior art as described above is still not adequate to permit omitting the means for focusing adjustment, i.e., the means for adjustment of the locations of the mirrors, for every different magnification mode. More specifically, when the conventional prior art apparatus, wherein the mirrors are specifically moved by the movement of a single cam, with the lens assembly at each predetermined position being positioned by a stationary stop for each mode, is used for a paired optical system as described above, the locations of the mirrors effected in association with the reduced size reproduction mode (or alternatively, the enlarged size reproduction mode) will be shifted from their fixed locations by an adjustment of the mirrors effected in association with the enlarged reproduction mode (or alternatively, the reduced size reproduction mode), with the result that the conventional apparatus as described above is substantially not applicable.

SUMMARY OF THE INVENTION

Accordingly, an essential object of the present invention is to provide an optical assembly capable of being used in a copying machine of the type having a plurality of magnification modes.

Another important object of the present invention is to provide an optical assembly of the above-described type, in which a conversion from one operating magnification mode to another operating magnification mode, both of which, however, have the same conjugate distance, can be achieved quite simply.

A further object of the present invention is to provide an optical assembly of the above-described type, which is compact and adaptable for any type of electrophotographic copying machine.

A still further object of the present invention is to provide an optical assembly of the above-described type which is simple to operate.

In accomplishing these and other objects according to one preferred embodiment of the present invention, there is provided an optical assembly for use in copying machines as will be described hereinbelow. In an electrophotographic copying machine equipped with an optical assembly of the present invention, the conversion between two magnification modes, both of which, however, require the same amount of change in the conjugate distance with respect to the conjugate distance of the full size reproduction mode, can be successively accomplished simply by varying the position of the lens assembly in the optical system, a simple adjustment for the end position of the lens assembly being included therein. More specifically, according to the present invention, in respect to the minute adjustment of the end positions of the optical system for magnification modes having the same conjugate distances as described above, the minute adjustment for one of such two magnification modes is first performed by adjusting the position of the mirror assembly, while any further adjustment which is necessary for the change to the other of such magnification modes is performed only by adjusting the end position of the lens assembly at the end position for such other magnification mode. Hence, during the change of the magnification modes, the adjusted position of the mirror assembly per se is kept unchanged. By this arrangement, in an optical system having the same conjugate distances, the conversion of magnification mode from one such mode to the other does not substantially affect the position of the mirror assembly which has been set for such one magnification mode.

BRIEF DESCRIPTION OF THE DRAWINGS

These and other objects and features of the present invention will become apparent from the following description taken in conjunction with the preferred the accompanying drawings in which.

Before the description of the present invention proceeds, it is to be noted that like parts are designated by like reference numerals throughout several views of the accompanying drawings.

DETAILED DESCRIPTION OF THE INVENTION

Figure 2:
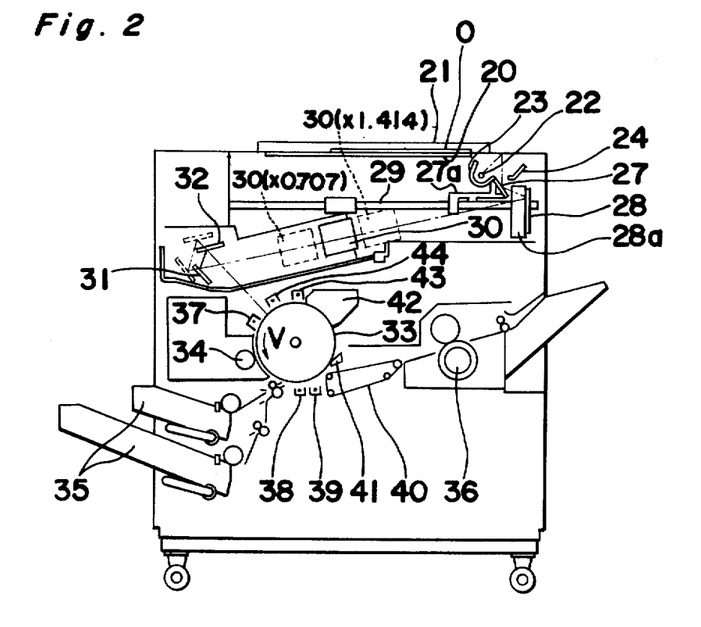
FIG. 2 is a schematic sectional side view of a copying machine having the present invention incorporated therein.

Referring now to FIG. 2, there is shown an electrophotographic copying machine of a type having a plurality of magnification modes and incorporating the present invention, i.e., an optical assembly for use in a copying machine with an adjustment means for controlling the correlation of members constituting an optical system to suit a particularly selected magnification mode. The copying machine comprises a transparent support plate 20 for the support of an original O, a flexible or rigid cover 21 for covering the original O from above and an illuminating unit including an illuminating lamp 22 which is connected to a light control means constituted by an electric power control circuit (not shown). The illuminating unit further includes a reflective shade 23 so designed as to reflect the rays of light emitted from the lamp 22 towards the transparent support 20 to illuminate the original O placed on the transparent support 20. This illuminating unit is adapted to be moved together with a slit defining structure 24 and a first reflective mirror 27, which are both integrally connected to the illuminating unit by a holder 27a, at a predetermined velocity V along a guide rail 29 by any known drive mechanism to illuminate the original O on the transparent support 20 while scanning such original O. A second reflective mirror 28 coupled to a holder 28a is also moved at a predetermined velocity V/2 along the guide rail 29. Rays of light reflected from the original O and carrying an image of the original are transmitted to a projecting lens assembly 30 and then reflected by third and fourth reflective mirrors 31 and 32 onto a photoconductive surface of a photoreceptor drum 33 being rotated in one direction at a peripheral velocity equal to the velocity V of movement of the illuminating unit so that an electrostatic latent image having a configuration corresponding to the original image thus projected will be formed on the photoconductive surface of the photoreceptor drum as is well known to those skilled in the art.

During the continued rotation of the photoreceptor drum 33, the electrostatic latent image on the photoconductive surface is brought to a developing station where a powdery material is dispensed by a developer unit 34 onto the photoconductive surface to develop the latent image to a toner image. This toner image on the photoconductive surface of the photoreceptor drum 33 is subsequently brought to a transfer station where the toner image is transferred onto a sheet of final support material, for example, a copying paper fed from either one of paper supply units 35, the sheet of final support material with the toner image thus transferred thereonto being passed through a fixing station where heat is applied thereto from a heating roll assembly 36 to fix the toner image and then being ejected out of the copying machine.

In FIG. 2 reference numeral 37 designates a charge eraser to be used in the reduced size reproduction mode so as to erase unnecessary electrostatic charge at either of the opposite ends of the electrostatic latent image on the photoconductive surface of the photoreceptor drum 33, reference numeral 38 designates a transfer corona charger, reference numeral 39 designates an A.C. charger, reference numeral 40 designates a substantially endless belt for the transportation of the sheet of final support material to the fixing station, reference numeral 41 designates a separator pawl, reference numeral 42 designates a cleaner, reference numeral 43 designates an eraser and reference numeral 44 designates a corona charger, all of which are well known both as to the construction and arrangement thereof and, therefore, the details thereof omitted for the sake of brevity.

It is to be noted here that the copying machine to which the present invention is applied is of a type having a plurality of magnification modes, including at least one paired reduced and enlarged size reproduction modes each having the same conjugate distance. More specifically, the relationship among the plurality of magnification modes, is for example, a full size reproduction mode having a magnification of ($\times 1$), a substantially enlarged size reproduction mode having a magnification of ($\times 1.414$) and a substantially reduced size reproduction mode having a magnification of ($\times 0.707$). In the full size reproduction mode, the lens assembly 30, the third and fourth mirrors 31 and 32 are positioned in respective positions as denoted by full lines in FIG. 2. On the other hand, when the operational mode is the enlarged size reproduction mode, the lens assembly 30 is in the position as denoted by the chain lines on the right-hand side, whereas the assembly 30 takes the position denoted by the chain lines on the left-hand side when the operational mode is the reduced size reproduction mode. For both the reduced size reproduction modes and enlarged size, the third and fourth mirrors 31 and 32, however take the same position, i.e. the position as denoted by the chain lines in FIG. 2.

In the following, the drive mechanisms for the projecting lens assembly 30, the third mirror 31 and the fourth mirror 32, and their respective positioning devices are described in detail.

Figure 3:
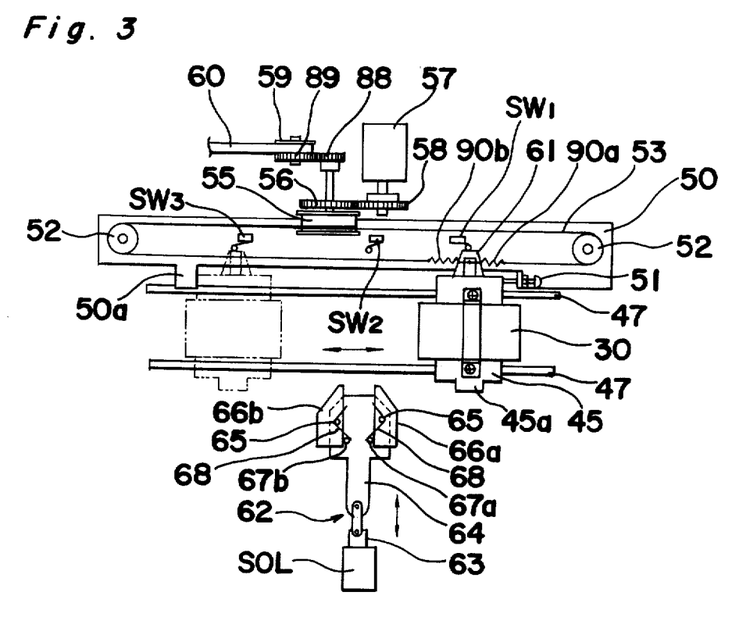
FIG. 3 is a schematic elevation view of a drive mechanism for driving the projecting lens assembly.

With respect to the drive mechanism for the projecting lens assembly 30, as shown in FIG. 3, the lens assembly is mounted on the holder 45 and is slidably movable together with the holder 45 on a pair of guide rails 47 between the first position and the second position through an intermediate position. The first position as denoted in full lines in FIG. 3 is the position for the enlarged size magnification mode; the second position denoted by the chain lines in FIG. 3 is the position for the reduced size magnification mode; and the intermediate position is for the full size magnification mode.

The drive mechanism includes an elongated side plate 50 held by a frame (not shown here). This side plate 50 carries a pair of spaced pulleys 52 rotatably mounted on respective end portions of the side plate 50. A cable 53 has its opposite ends rigidly secured to the holder 45 by respective tension adjusting springs 90a and 90b, the intermediate portion thereof extending around one of the pulleys 52 and then around the other of the pulleys 52 so that movement of the cable 53 effected in a manner as will be described later is accompanied by a corresponding movement of the projecting lens assembly 30 mounted on the holder 45. For causing the cable 53 to move in the manner described above, a portion of the cable 53 extending between the pulleys 52 has a few convolutions wound around a drive pulley 55. This drive pulley 55 has a driven gear 56 rigidly connected thereto or otherwise formed integrally therewith, said driven gear 56 being held in constant mesh with a drive gear 58 which is rigidly mounted on an output shaft of an electrically driven reversible motor 57.

In accordance with the rotation of the electrically driven reversible motor 57 in the forward to the reverse rotational direction, the lens assembly 30 is slidably moved together with the holder 45 between the first position and second position through the intermediate position as described above. Structurally, the first, intermediate and second positions of the projecting lens assembly 30 are respectively defined by microswitches SW1, SW2 and SW3 provided on the side plate 50 and arranged in the path of travel of a cam projection 61 rigidly mounted on or otherwise formed integrally with the holder 45, so that when the projecting lens assembly 30 is brought to the first, intermediate or second position, the corresponding switch SW1, SW2 or SW3 is opened to interrupt the supply of electric power to the drive motor 57. The above switch SW1 is slidably provided on the side plate 50 in the direction of the movement of the lens assembly 30 so as to make it possible to adjust the first position. For avoiding an overrun of the projecting lens assembly 30 beyond either of the first and second positions, a fixed stop 50a and a stop on a screw type 51 are provided separately of the side plate 50 and arranged at respective positions corresponding to the first and second positions of the projecting lens assembly 30. A positioning device 62 for firmly holding the projecting lens assembly 30 at the intermediate position immediately after the assembly 30 has been moved thereto from either the first position or the second position is arranged on one side of the guide rails 47 opposite to the microswitch SW2. This positioning device 62 comprises a solenoid unit SOL having a plunger 63 movable between retracted and projected positions, said solenoid unit SOL being adapted to be energized to move the plunger 63 from the retracted position towards the projected position when one of several magnification selector switches (not shown) which is associated with the intermediate magnification mode is manipulated by an operator of the copying machine. The positioning device 62 further comprises a carrier block 64 connected to the plunger 63 for linear movement together with the plunger 63, a pair of blocking pieces 66a and 66b pivotally mounted on the carrier block 64 by respective support pins 65, a pair of positioning pins 67a and 67b rigidly mounted on the carrier block 64, and a pair of biasing springs generally identified by 68 and shown in the form of a wire spring. This positioning device 62 is so arranged that, when the projecting lens assemble 30 is held in either one of the first and second positions, each of the blocking pieces 66a and 66b is held in an engageable position, as shown in FIG. 3, by the action of the corresponding biasing spring 68 with one end engaged with the corresponding positioning pins 67a and 67b. Accordingly, these blocking pieces 66a and 66b in their respective engageable positions extend substantially in parallel relation to each other. The control of the electrically driven reversible motor 57 is arranged to be performed by several magnification selector switches arrayed on a control panel (not shown here) together with a related controlling circuit means, whereby the supply of the electric power to the drive motor 57 is interrupted by a signal generated in response to actuation of any of the microswitches SW1, SW2 and SW3 as previously described.

Figure 4A:
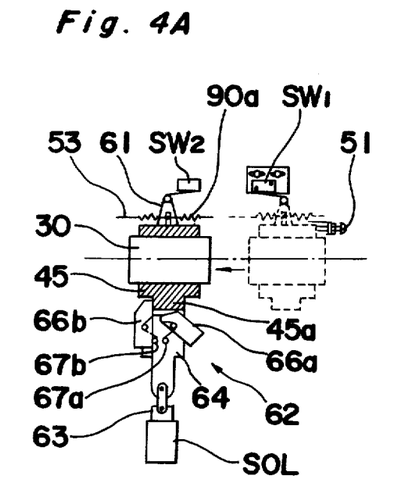
FIGS. 4(A) and 4(B) are schematic views showing a stop mechanism in different operative positions.

Still referring to FIG. 3, the projecting lens assembly 30 is initially held at the first position. Starting from this condition, the manipulation of the magnification selector switch (not shown) associated with the intermediate magnification mode results in a switching of a drive circuit for the drive motor 57 to energize the motor 57, whereby projecting lens assembly 30 on the holder 45 is moved in a direction from the first position towards the left. During the movement of the projecting lens assembly 30 towards the left, the projection 45a on the holder 45 engages the blocking piece 66a, thereby causing the latter to pivot counterclockwise about the support pin 65 against the action of the biasing spring 68 until the projection 45a abuts the blocking piece 66b as shown in FIG. 4A. Simultaneously with the engagement of the projection 45a of the holder 45 with the blocking piece 66b, the microswitch SW2 is opened by a cam projection 61 to interrupt the supply of the electric power to the drive motor 57. In this manner, the projecting lens assembly 30 is brought to the intermediate position. It is to be noted here that the projecting lens assembly 30 may tend to move further towards the second position, even after the supply of the electric power to the motor 57 has been interrupted, under the influence of the inertia force of the drive motor 57. In practice, according to the present invention, since the counterclockwise rotation of the blocking piece 66b does not occur subsequent to the engagement of the projection 45a with the blocking piece 66b by the reason of the employment of the positioning pin 67b which blocks the counterclockwise rotation of the blocking piece 66b, not only is this tendency advantageously avoided, but also the inertia force of the drive motor 57 is advantageously counteracted by the tension adjusting spring 90a which is stretched to absorb the inertia force of the motor 57. Therefore, the projecting lens assembly 30 is firmly held in the intermediate position while being urged against the blocking piece 66b.

If another magnification selector switch is manipulated to switch over from the intermediate magnification mode to the reduced magnification mode, the drive circuit for the motor 57 is switched over to drive the motor 57 on one hand and to actuate the solenoid unit SOL to move the plunger 63 from the projected position to the retracted position on the other hand. As the solenoid plunger 63 is moved from the projected position towards the retracted position, the blocking piece 66b which has been held in position to block the movement of the projecting lens assembly 30 is retracted out of the path of travel of the projection 45a on the holder 45, thereby disengaging from the projection 45a while the blocking piece 66a which has been rotated counterclockwise is caused to pivot clockwise back to the original position by the action of the biasing spring 68. Accordingly, driven by the motor 57, projecting lens assembly 30 moves from the intermediate position towards the second position.

Figure 4B:
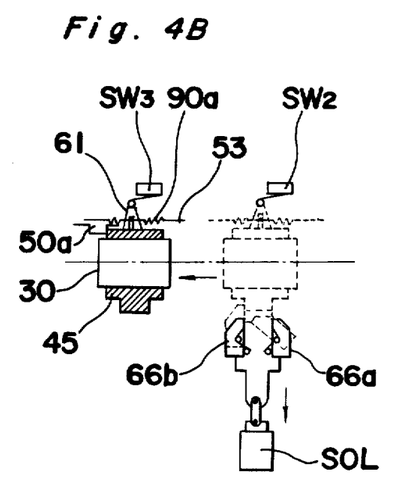

Upon arrival of the projecting lens assembly 30 at the second position where the holder 45 is engaged with the stop 50a, the microswitch SW3 is opened by the cam projection 61 to interrupt the supply of the electric power to the drive motor 57, whereby the projecting lens assembly 30 is held at the second position as shown in FIG. 4B.

Figure 5A:
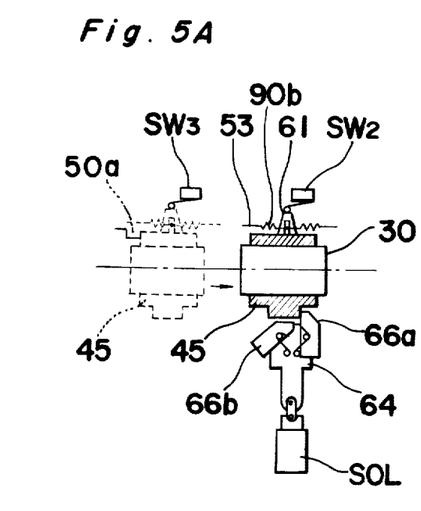
FIGS. 5(A) and 5(B) are views similar to FIGS. 4(A) to 4(B)
Figure 5B:
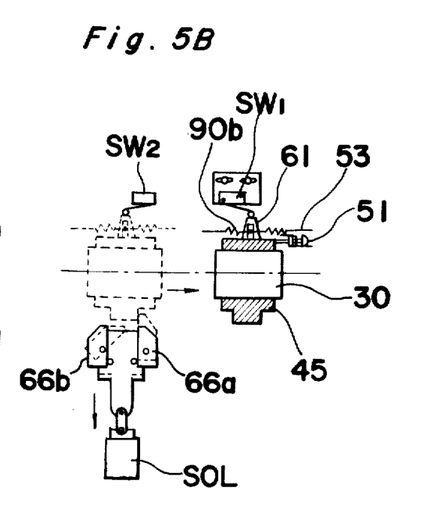

When, with the projection lens assembly 30 in the second position, it is desired to move the assembly 30 the intermediate position as shown in FIG. 5A, it is only necessary to reverse direction of rotation of the drive motor 57. Similarly, where the projecting lens assembly 30 in the intermediate position is desired to be moved to the first position as shown in FIG. 5B, it is only necessary to actuate the solenoid unit SOL to move the plunger 63 from the projected position towards the retracted position on one hand and to reverse the direction of rotation of the drive motor 57 on the other hand.

Figure 6:
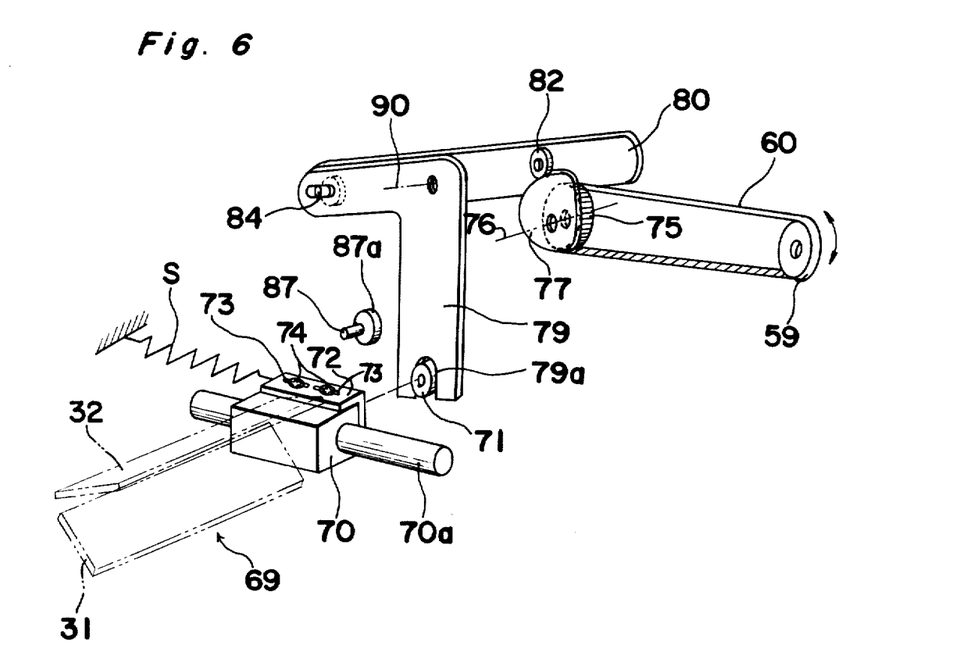
FIG. 6 is an exploded perspective view of a mechanism for driving reflective mirrors employed in the copying machine shown in FIG. 2.

Referring now to FIGS. 6 to 9B, the mirror carriage is designated by 70. This mirror carriage 70 has an assembly 69 of the third and fourth reflective mirrors 31 and 32 rigidly mounted thereon and is mounted on a guide rail 70a for movement between first and second positions, said positions of the mirror carriage 70 respectively corresponding to the intermediate position and to the first and second positions of the projecting lens assembly. More specifically, with respect to the drive mechanism for the assembly 69, since the driven gear 56, shown in FIG. 3, always meshes with the drive gear 58 which is rigidly mounted on the output shaft of the electrically driven reversible motor 57 as previously described, a drive gear 88 mounted on the same shaft as the driven gear 56 is rotated by the motor 57. Furthermore, an endless belt 60 extends around a driven pulley 59 integrally formed with a driven gear 89, which driven gear 89 meshes with the drive gear 88, and also extends around a driven pulley 75 rigidly mounted on a shaft 76 journalled in a frame (not shown) of the copying machine as shown in FIG. 6. Therefore, the endless belt 60 is rotated when the motor 57 is driven. The shaft 76 also has a cam wheel 77 rigidly mounted thereon. Still referring to FIG. 6, a pair of elongated levers 79 and 80 are pivotally mounted on a shaft 90 supported by the frame (not shown) and the lever 80 carries a cam follower 82 which is engaged with the peripheral face of the cam wheel 77. The free end of the lever 79 remote from the shaft 90 has an engagement recess 79a in which a roller 71 is engaged. The roller 71 is mounted on a carrier plate 72 having a substantially L-shaped configuration and the carrier plate 72 is mounted on the mirror carriage 70 by means of a plurality of, for example, two, screws or pins 74 which extend through respective slots 73 in said carrier plate 72. Because the carrier plate 72 is mounted on the mirror carriage 70 in the manner described above, it will readily be seen that by loosening the screws 74, a fine adjustment of the position of the carrier plate 72 relative to the mirror carriage 70 can be made, after which the screws are tightened. The mirror carriage 70 is movably mounted on the guide rail 70a with the roller 71 protruding in a direction perpendicular to the longitudinal axis of the guide rail 70a. The mirror carriage 70 is normally biased toward the left in FIG. 6 by a biasing spring S which may be a tension spring, whereby since the levers 79 and 80 are urged towards clockwise, the cam follower 82 abuts the peripheral cam face of the cam wheel 77. In the construction described above, it will readily be seen that the movement of the endless belt 60 causes the levers 79 and 80 to be pivotally moved, and the pivotal movement of the levers 79 and 80 is transmitted to the mirror carriage 70 through the roller 71 engaged in the engagement recess 79a to cause said mirror carriage 70 to move along the guide rail 70a.

Figure 7A:
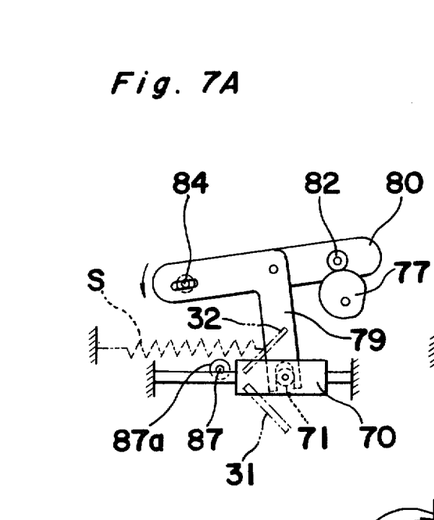
FIGS. 7(A) and 7(B) are schematic views of a portion of the mirror drive mechanism of FIG. 6 in different positions respectively associated with the positions of the respective mirrors.

In the full size reproduction mode, the third and fourth mirrors 31 and 32 are held in the first position illustrated in FIG. 7A, which corresponds to the position illustrated by the full lines in FIG. 2. However, when the reproduction is either in the enlarged size reproduction mode or in the reduced size reproduction mode, the third and fourth mirrors 31 and 32 are held in the second position illustrated in FIG. 7B, the second position corresponding to the position illustrated by the broken lines in FIG. 2. The adjustments of the end position of the third and fourth mirrors 31 and 32 as described above are performed by the following adjustment means and manner according to the present invention.

In the situation as shown in FIG. 7A, the cam follower 82 is in contact with a portion of the peripheral cam face of the cam wheel 77 which has a maximum radius with respect to its center coinciding with the center of an aperture for the shaft 76. A minute adjustment of the position of the mirrors 32 and 31 in addition to that described above using screws 74 can be performed with the help of an adjustment member 84 which is threadingly and eccentrically engaged with the lever 80 and extends through a slot defined in the lever 79, whereby the relative angle between the respective levers 79 and 80 can be adjusted by pivoting the levers 79 and 80 relative to each other about the longitudinal axis of the shaft 90 by turning the adjustment member 84 in either direction about the longitudinal axis thereof. After the minute adjustment has once been made, these levers 79 and 80 are relatively fixed with respect to each other, for example, by screws (not shown), whereby these levers 79 and 80 are also, integrally fixed with respect to the cam wheel 77.

Figure 7B:
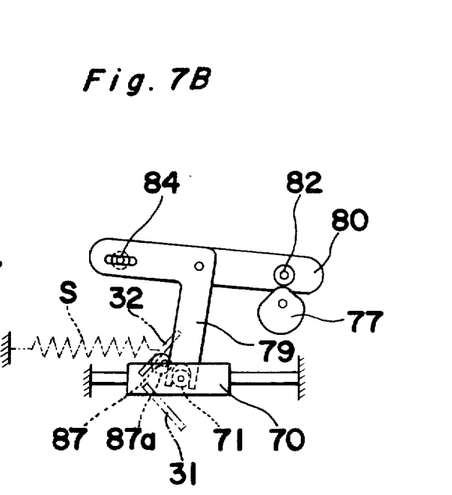

In the situation as shown in FIG. 7B, the cam follower 82 is opposed to but does not engage a further portion of the peripheral cam face of the cam wheel 77, which further portion has a minimum radius with respect to its eccentrically provided center, the cam wheel 77 having been rotated for approximately 180 degrees from the position shown in FIG. 7A. During the rotation of the cam wheel 77, the whole lever keeps rotating until a side of the lever 79 is engaged with an adjustable stop 87 so as to stop the movement of the cam follower 82 toward the cam wheel 77 at the position shown in FIG. 7B. The adjustable stop 87 is eccentrically secured to a rotatable shaft 87a which can be secured to a side plate (not shown) forming a part of the frame of the copying machine, so that the respective positions of the third and fourth mirrors 31 and 32 can be adjusted by rotating the shaft 87a for adjusting the end position of the mirrors 31 and 32 for the reduced and enlarged size reproduction modes.

Figure 8:
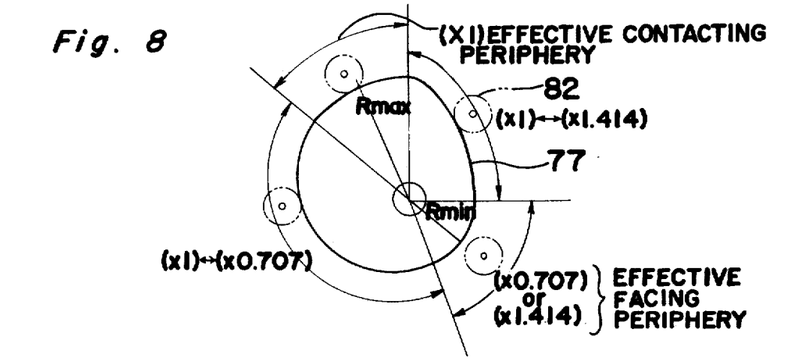
FIG. 8 is a schematic side elevational view of cam profile employed in the mechanism for driving reflective mirrors.

The cam wheel 77 has shape as shown in FIG. 8 according to the present invention. Due to the reasons as described below, the cam profile of the cam wheel 77 is shaped so that the cam wheel 77 must complete approximately one rotation during the sliding movement of the lens assembly 30 from the first to the second position or vice versa. The respective members of gear teeth on the gears 88 and 89 are such as to cause the cam wheel 77 to carry out this rotation.

As has already been discussed with reference to FIG. 1, when the focal length of the lens assembly 30 is $f=280$ mm, there exists the following difference in respective displacements of the lens assembly 30 for the different operating modes of the copying machine, i.e., $l_1 \approx 82$ mm for the enlarged size reproduction mode of ($\times 1.414$) and $l_2 \approx 116$ mm for the reduced size reproduction mode of ($\times 0.707$), respectively. However, the conjugate distance for both cases is the same. Such being the case, the cam wheel 77 has to rotate correspondingly by an amount proportional to each displacement of the lens assembly 30. In addition, as described previously, the cam wheel 77 has to have its surface portion of the peripheral cam face with the minimum radius facing the follower 82 for respective reduced and enlarged size reproduction modes.

If the profile of the cam wheel 77 is not defined as described above, the absolute torque or the variation in torque to be effected for the rotation of the cam wheel 77 will be increased during the changeover from the enlarged size reproduction mode to the reduced size reproduction mode or during the reverse operation, due to the abrupt change in the circumferential dimension of the cam wheel 77. Consequently, the rotational angle of the cam wheel 77 with respect to the center is so arranged that the cam wheel 77 will perform the approximately one rotation during the slidable movement of the assembly 30 as described above.

As is shown in FIG. 7B, the predetermined location of the mirror assembly 69 including the third and fourth mirrors 31 and 32 for the enlarged size reproduction mode is the same as that for the mirror assembly 69 for the reduced size reproduction mode, with the lens assembly 30 being disposed in the first position as indicated by the full lines in FIG. 3. During operation in the reduced size reproduction mode, the lens assembly 30 is precisely disposed in the second position as indicated by the chain lines in FIG. 3 by the fixed stop 50a on the side plate 50, and for this condition, any error in the conjugate distance is corrected by adjusting the end positions of the third and fourth mirrors 31 and 32 by the adjustable stop 87 in the manner as described above. As is evident from the description above, if, for operation in the enlarged size reproduction mode, the end positions of the third and fourth mirrors 31 and 32 has to be rearranged for proper focal adjustment for this mode, this would result in loss of the adjustment for the reduced size reproduction mode. Therefore, such being the case, the focal adjustment for the enlarged size reproduction mode is performed by adjusting the end position of the lens assembly 30 by means of a stop 51 of the screw type and the location of the microswitch SW1 is also readjusted properly by loosening the screws (unnumbered) on the support for microswitch SW1, as shown in FIG. 4A.

According to the embodiment above, both the first mirror 27 coupled to the holder 27a and the second mirror 28 coupled to the holder 28a are relatively movable between the respective predetermined positions on the frame of the copying machine. When the apparatus is full in the size reproduction mode, the location of the lens assembly 30 coupled to the holder 45 will be established by the positioning device 62 so as to provide the correct object distance, and if a focal adjustment is necessary, it can be carried out by turning the adjustable member 84, thereby adjusting the relative angle between the respective levers 79 and 80 and thus adjusting the location of the mirror assembly 69 including the third and fourth mirrors 31 and 32. For the reduced size reproduction mode, the focal adjustment is accomplished by the adjustment of the mirror assembly 69, i.e. adjustment of the respective locations of the third and fourth mirrors 31 and 32, by rotating the shaft 87a. When in the enlarged size reproduction mode, the end positions of the third and fourth mirrors 31 and 32 is established by the position of the shaft 87a, and any focal adjustment which is necessary is performed by adjusting the end position of the lens assembly 30 by the screw type stop 51.

Furthermore, to insure appropriate positioning of the lens assembly 30 at the predetermined locations, the engagement between the holder 45 and both the stop 50a and the stop 51 and the engagement between the projection 45a on the holder 45 and the blocking piece 66a and the blocking piece 66b are somewhat resilient, respectively, since the opposite ends of the cable 53 are rigidly secured to the holder 45 by respective tension adjusting springs 90a and 90b. Such being the case, the inertia of rotational movement inherent in the motor at the time of interruption of the supply of electric power is well absorbed, whereby the overrun of the lens assembly 30 is prevented and it is positioned at the respective predetermined positions in a precise manner. In addition, in a case wherein the position of the lens assembly 31 is adjusted by the stop 51 at the first position, since the holder 45 per se is urged toward the stop 51, even a minute adjustment of the lens assembly 30 can be performed in a very handy manner. In addition, even where the position of the lens assembly 30 has been adjusted by the stop 51 at the first position the holder 46 per se is urged toward the stop 51, and thus the minute adjustment of the lens assembly 30 even when the holder 45 is urged thereagainst can be performed in quite a handy manner. As a stop for the minute adjustment of the position of the lens assembly 30, there can also be used a stop the engageable portion of which is formed by an eccentric cam.

In contrast to the above-described arrangement for adjusting the optical system including the lens assembly 30 and the mirror assembly 69, a modified embodiment, in which for the reduced size reproduction mode, the position of the lens assembly 30 can be adjusted by a screw type stop, and the respective positions of the third and fourth mirror 31 and 32 can be adjusted by an adjustable stop like the stop 87 for the enlarged size reproduction mode, will serve the purpose of the present invention.

Figure 9A:
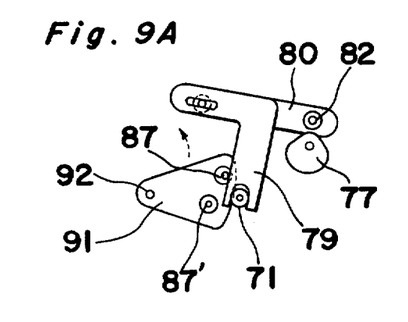
FIGS. 9(A) and 9(B) are views similar to FIGS. 7(A) and 7(B), but particularly showing a different embodiment.
Figure 9B:
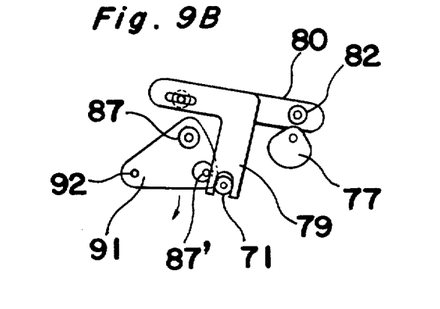

Referring now to FIGS. 9A and 9B there is shown a further embodiment of means which can be employed for adjusting the end position of the mirror assembly 69. According to this embodiment, for enlarged and reduced size reproduction modes, the end portion of the mirror assembly 69 including the third and fourth mirror 31 and 32 is independently adjustable. Hence, in contrast to the above-described arrangement, no adjustment of the end position of the lens assembly for operation in the enlarged size reproduction mode, as described previously, is required. According to this embodiment, for the enlarged and reduced size reproduction modes, the end position of the mirror assembly 69 including the third and fourth mirrors 31 and 32 is independently adjustable of any adjustment of the end position lens assembly for operation in both the enlarged and reduced size reproduction modes and this adjustment can be effected without taking into consideration any minute adjustment of the lens assembly 30 as described above. In detail, as is clear from FIGS. 9A and 9B, there is provided a change-over lever 91 pivotally mounted on a shaft 92, and on which there is mounted not only the adjustable stop 87 to be engaged by the side periphery of the lever 79 in the reduced size reproduction mode, but also a stop 87' to be engaged by the side periphery of the lever 79 in the enlarged size by the reproduction mode. The two stops 87 and 87' are eccentrically disposed relative to each other with respect to the shaft 92, respectively. Hence, the change-over lever 91 is pivotally moved with respect to the shaft 92 to such the extent that one or the other of the adjustable stops 87 and 87' is selectively engaged with the side periphery of the lever 79, in accordance with the selection of the mode of operation, i.e., the reduced size reproduction mode or the enlarged size reproduction mode. In addition, for the respective operating modes, minute adjustment of the end positions of the mirror assembly 69 can be accomplished by turning the respective adjustable stops 87 and 87'.

In this embodiment, the lever 91 must be pivotally moved whenever the conversion of operating mode from the enlarged size reproduction mode or the reverse takes place. This requires not only a rather complicated construction for the conversion of the operating mode, but also high precision control of the pivotal movement of the lever 91 with respect to the shaft 92.

As is clear from the foregoing description, this invention relative to an electrophotographic copying machine of the type selectively operable in a plurality of magnifications, in which the change between two magnification modes, both of which however require the same amount of change of the conjugate distance with respect to the conjugate distance of the full size reproduction mode, can be accomplished only by varying the position of the lens and the mirror assemblies in the optical system, and simple means for the adjustment of the end positions of the assemblies is included therein.

More specifically, according to the present invention, for the minute adjustment of the optical system set for magnification modes having the same conjugate distances as described above, the minute adjustment for one of the two magnification modes is performed by adjusting only the end the location of the mirror assembly, while the adjustment for the change to the other of the two magnification modes is performed only by adjusting the end position of the lens assembly while leaving the location of the mirror assembly being, however, kept unchanged from its end position for the said one magnification mode. By this arrangement, changing between the magnification modes having the same conjugate distances does not substantially affect the end positions of the mirror assembly set for the original magnification mode.

In the foregoing, although the adjustment means for controlling the correlation of members constituting the optical system to suit the particular magnification mode is described in detail with respect to an electrophotographic copying machine of the slit exposure type having a mirror scanning system, the adjustment means of the present invention is not limited to the copying machine of the above-described type.

Figure 10:
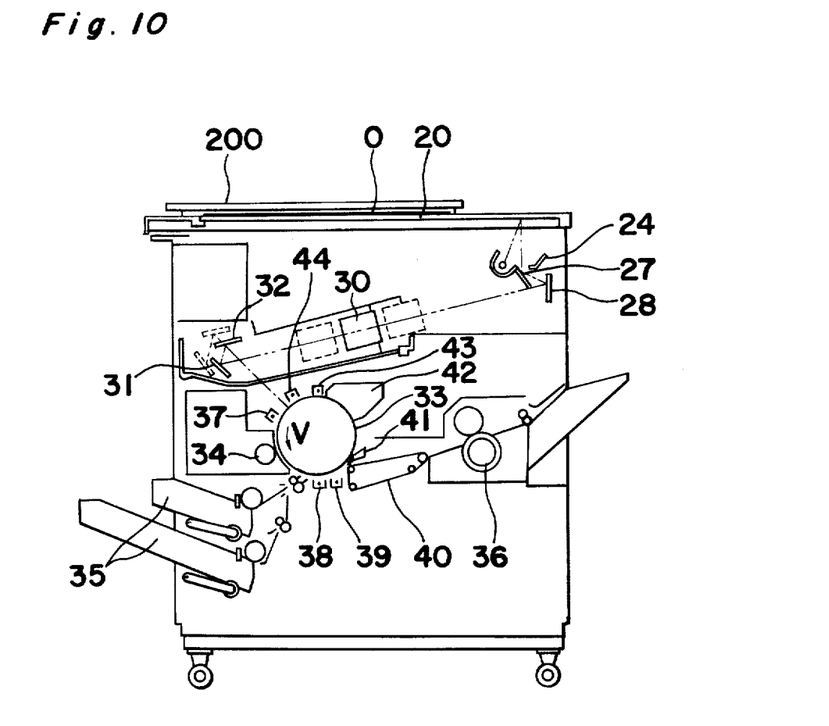
FIG. 10 is a view similar to FIG. 2, but showing the present invention incorporated in a copying machine of a different type.

Referring now to FIG. 10, there is shown an electrophotographic copying machine of the slit exposure type having a manuscript platform scanning system which can include the present invention. As can be easily understood, this electrophotograhic copying machine does not have constructional characteristics substantially different from the electrophotographic copying machine of the slit exposure type with the mirror scanning system, except that the first and second mirrors 27 and 28 for this machine are both secured to appropriate frames (not shown) of the machine. The functional characteristics of this copying machine can be summarized as follows.

The original O to be copied is first set on the transparent support plate 20 for a manuscript tray 200, which is capable of being substantially horizontally reciprocally moved. Upon completion of an actuation of a solenoid for scanning (not shown), the manuscript tray 200 starts substantially horizontal, rightward movement in FIG. 10. In accordance with the movement of the tray 200, the image light is successively directed onto the photoreceptive drum 33 by the optical system of this copying machine. The successive copying steps are the same as those which have been described in detail previously in connection with the copying machine shown in FIG. 2.

From the construction and function of this electrophotographic copying machine, it is apparent that the adjustment means of the present invention is quite easily applied to the copying machine as shown in FIG. 10.

Figure 11:
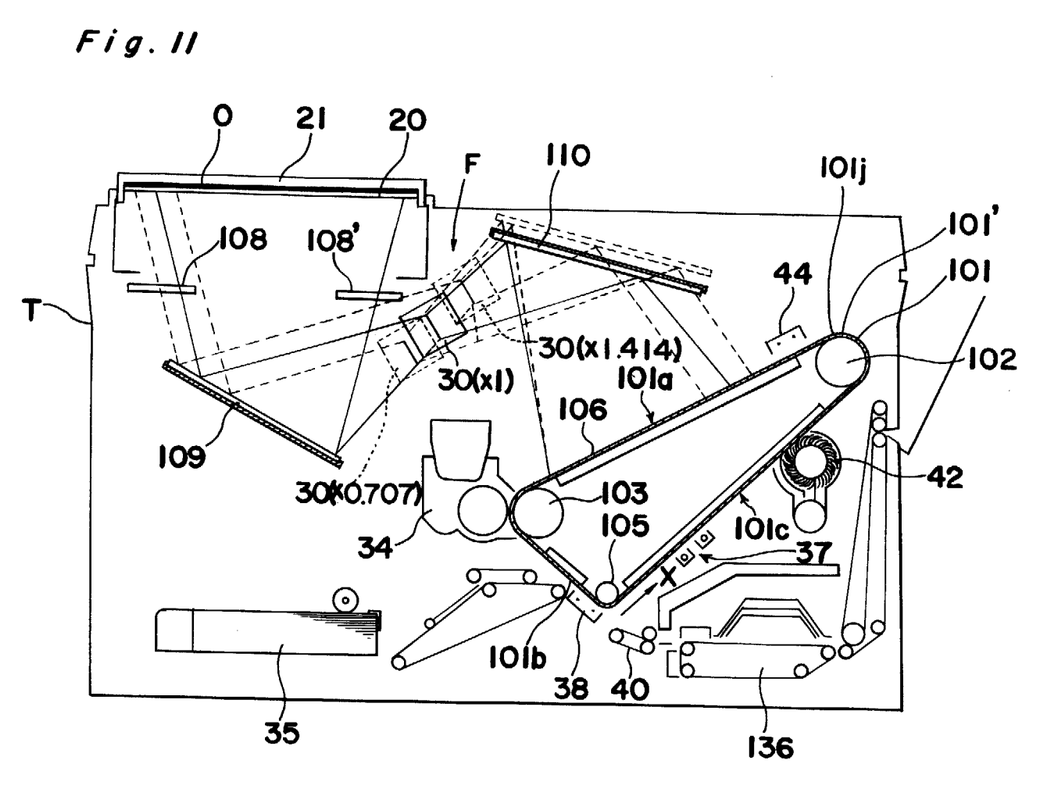
FIG. 11 is a view similar to FIG. 2, but showing the present invention incorporated in a copying machine of a still further different type.

Referring now to FIG. 11, there is shown an electrophotographic copying machine of the total exposure type which can include the present invention. The construction and the functional characteristics of this copying machine can be summarized as follows.

The electrophotographic copying machine of the total exposure type comprises an electrophotosensitive web or belt 101 having a photoconductive photoreceptor surface 101' on a conductive backing and extending for continuous movement in the direction of the arrow X, around an idle roller 102, a follower roller 103, and a driving roller 105 having parallel axes so as to cause the photoreceptor surface 101' to sequentially pass a plurality of processing stations, such as a charging station with a corona charger 44 an exposure station 106, a developing station having a developing device 34, a transfer station provided with a transfer corona charger 38, a charge erasing station 37 and a cleaning station provided with a residual toner removing device 42, each of which is disposed along a path of a photoreceptor surface 101' having three flat surfaces 101a, 101b and 101c between the neighboring rollers 102, 103 and 105, a transparent platform 20 to support an original O to be copied thereon and which is fixedly supported at an upper portion of the apparatus housing T, a platform cover 21 pivotally secured in position to cover the platform 20, a pair of linear light sources 108 and 108' for illuminating the original O which are provided below and adjacent to said platform 20, and an optical system F disposed between the platform 20 and the flat surfaces 101a of the photoreceptor 101' for directing image rays of the original onto the exposure position 106 on the surface 101a for forming an electrostatic latent image thereon.

The transparent platform 20 fixed horizontally at the upper portion of the apparatus housing T is provided with a cover plate 21a pivotally secured in position for covering and forcing the original to be copied into intimate contact with the platform 20. The linear light sources 108 and 108' disposed below and adjacent to the platform 20 for total exposure of the original are, for example, flash discharge lamps. The optical system F comprises a mirror 109 fixedly disposed below the platform 20 and suitably inclined to direct the image rays from the original O to a mirror 110 through a lens 30, which mirror 110 in turn directs the image rays onto the exposure portion 106 on the photoreceptor surface 101a of the belt 101 to form the latent image of the original thereon. The location of the mirror 110 can be changed and is adjustable according to the present invention. The lens assembly 30 is slidably supported by the supporting mechanism according to the present invention which is provided in such position so as to be alternatively disposed on the optical axis for suitably changing the magnification of the size of the original images to be copied.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. An optical assembly for use in a copying machine of a type including an enlarged size reproduction mode and a reduced size reproduction mode each having the same conjugate distance, said assembly comprising: a projecting lens assembly, a reflective mirror assembly, a drive mechanism connected to said projecting lens assembly for driving said lens assembly between first and second lens assembly positions corresponding to the positions of said lens assembly for the respective reproduction modes, a mechanism connected to said mirror assembly for driving said mirror assembly to a single predetermined mirror assembly position which is the position of said mirror assembly for both reproduction modes, means for adjusting the mirror assembly position of said mirror assembly for proper focal adjustment for the condition in which said projecting lens assembly is at the first lens assembly position corresponding to the one reproduction mode, and means for adjusting the second lens assembly position of said projecting lens assembly for proper focal adjustment for the condition in which said projecting lens assembly is at the second lens assembly position for the other reproduction mode and said mirror assembly is in the adjusted mirror assembly position.

2. An optical assembly as claimed in claim 1 wherein said mechanism for driving said projecting lens assembly further comprises a non-adjustable stop member for defining the first lens assembly position of said projecting lens assembly for said one reproduction mode, and said means for adjusting the second lens assembly position of said lens assembly is an adjustable stop member.

3. An optical assembly as claimed in claim 1 wherein said means for adjusting the mirror assembly position of said reflective mirror assembly comprises an adjustable stop member for defining said position of said reflective mirror assembly, and an urging means acting on said mirror assembly for urging said reflective mirror assembly into contact with said adjustable stop member.

4. An optical assembly as claimed in claim 1 wherein said one reproduction mode is the reduced size reproduction mode and said means for adjusting the second lens assembly position of said lens assembly is at the position at which said lens assembly is positioned in the enlarged size reproduction mode.

5. An optical assembly as claimed in claim 4 wherein said drive mechanism for said projecting lens assembly further comprises a non-adjustable stop member at the first lens assembly position of said lens assembly when said lens assembly is in the position for the reduced size reproduction mode, and said means for adjusting the second lens assembly position of said lens assembly is an adjustable stop member, and said means for adjusting the mirror assembly position of said reflective mirror assembly comprises an adjustable stop member for defining said position of said reflective mirror assembly, and an urging means acting on said mirror assembly for urging said reflective mirror assembly into contact with said adjustable stop member.

6. An optical assembly for use in a copying apparatus which has an enlarged size reproduction mode and a reduced size reproduction mode each having the same conjugate distance, said assembly comprising:
- a movable projecting lens means;
- first drive means connected to said projecting lens means for driving said projecting lens means to first and second positions in association with a change of said reproduction mode from one of said enlarged size and reduced size reproduction modes to the other;
- first positioning means for non-adjustably positioning said projecting lens means at said first position and for adjustably positioning said projecting lens means at said second position;
- movable mirror means;
- second drive means connected to said mirror means for driving said mirror means to a predetermined position for both said enlarged size and reduced size reproduction modes; and
- second positioning means for adjustably positioning said mirror means at said predetermined position, whereby said second positioning means can be used for adjusting the position of said mirror means at said predetermined position for proper focal adjustment for the condition in which said projecting lens means is positioned at said first position and said second positioning means remains in said adjusted condition when said projecting lens means is moved to said second position and the second position of said lens means can be adjusted for proper focal adjustment for the condition in which said projecting lens is positioned at the second position.

7. An optical assembly as claimed in claim 6 wherein said first lens positioning means includes a non-adjustable stop member for positioning said lens means at said first position thereof and an adjustable stop member for adjustably positioning said lens member at said second position thereof, and said second positioning means includes an adjustable stop member for adjustably positioning said mirror means at said predetermined position thereof.

8. An optical assembly for use in a copying apparatus which has a full size, an enlarged size and a reduced size reproduction mode, said enlarged size and reduced size reproduction modes each having the same conjugate distance, said assembly comprising:
- movable projecting lens means;
- movable mirror means;
- first drive means connected to said lens means for driving said lens means to first and second lens means positions in association with change of said reproduction mode from one of said enlarged size and reduced size reproduction modes to the other, the movement of said projecting lens means being through an intermediate lens means position corresponding to the full size reproduction mode;
- first positioning means for non-adjustably positioning said lens means at said first lens means position and at said intermediate lens means position and for adjustably positioning said lens means at said second lens means position;
- second drive means connected to said mirror means for driving said mirror means between first and second mirror positions for changing the conjugate distance in association with a change of the reproduction mode from one of said enlarged size and reduced size reproduction modes to said full size reproduction mode; and
- second positioning means for adjustably positioning said mirror means at said first mirror position and for adjustably positioning said mirror means at said second mirror position, whereby said second positioning means can be used for adjusting the position of said mirror means at said first mirror position for proper focal adjustment for the condition in which said projecting lens means is positioned at said first lens means position and said second positioning means remains in the adjusted position when said projecting lens means is moved to said second lens means position and the second lens means position can be adjusted for proper focal adjustment for the condition in which said projecting lens means is positioned at the second lens means position, and said second mirror position can be adjusted when said lens means is at the intermediate lens means position.

9. An optical assembly as claimed in claim 8 wherein said first positioning means includes a non-adjustable stop member for positioning said lens means at said first position, a stop means movable in and out of the path of said lens means for stopping said lens means when it is moving in either direction at the intermediate lens means position, and an adjustable stop member at said second lens means position.

10. An optical assembly as claimed in claim 8 wherein said second positioning means includes an adjustable stop member for adjustably positioning said mirror means in said first mirror position, and adjustable means connected between said second drive means and said mirror means for adjustably positioning said mirror means at said second mirror position.

* * * * *